US012694536B2

(12) United States Patent
Wang et al.

(10) Patent No.: US 12,694,536 B2
(45) Date of Patent: Jul. 28, 2026

(54) MODEL TRAINING METHOD, IMAGE EDGE DETECTION METHOD, AND MULTI-SENSOR CALIBRATION METHOD

(71) Applicant: Robert Bosch GmbH, Stuttgart (DE)

(72) Inventors: Su Wang, Shanghai (CN); Tunan Shen, Shanghai (CN); Daqing Kong, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 18/464,224

(22) Filed: Sep. 10, 2023

(65) Prior Publication Data

US 2024/0095928 A1 Mar. 21, 2024

(30) Foreign Application Priority Data

Sep. 15, 2022 (CN) .......................... 202211122906.1

(51) Int. Cl.
 G06T 7/13 (2017.01)
 G06T 5/20 (2006.01)
 (Continued)

(52) U.S. Cl.
 CPC .................. G06T 7/13 (2017.01); G06T 5/20 (2013.01); G06T 7/50 (2017.01); G06T 7/80 (2017.01);
 (Continued)

(58) Field of Classification Search
 CPC .... G06T 7/13; G06T 5/20; G06T 7/50; G06T 7/80; G06T 2207/10024;
 (Continued)

(56) References Cited

U.S. PATENT DOCUMENTS

| 10,726,579 | B1 * | 7/2020 | Huang | .................. G01S 7/4972 |
| 2023/0251363 | A1 * | 8/2023 | Ren | ........................... G06T 7/33 |
| | | | | 356/4.02 |

(Continued)

OTHER PUBLICATIONS

Jang, B.-J.; Kim, T.-L.; Park, T.-H. Camera-LiDARWide Range Calibration in Traffic Surveillance Systems. Sensors 2025, 25, 974. https://doi.org/10.3390/s25030974 (Year: 2025).*

(Continued)

*Primary Examiner* — Andrae S Allison

(74) *Attorney, Agent, or Firm* — Maginot, Moore & Beck LLP

(57) ABSTRACT

A method for model training, an image edge detection method, a multi-sensor calibration method, a computer program product, and a computer device is disclosed. The model is used to generate occlusion relationships between pixel pairs. The model training method comprises: constructing an initial model; obtaining multiple training images and reference annotation results for each training image, wherein each training image comprises RGB features and depth features, and the reference annotation results for each training image are annotation results of occlusion relationships between adjacent pixel pairs in said training image generated based on the depth features of said training image; respectively using the RGB features of the multiple training images as inputs to the initial model, using the reference annotation results corresponding to the input training images as outputs of the initial model, and training the initial model to obtain a well-trained model.

17 Claims, 6 Drawing Sheets

(51) Int. Cl.

| | |
|---|---|
| *G06T 7/50* | (2017.01) |
| *G06T 7/80* | (2017.01) |
| *G06V 10/26* | (2022.01) |
| *G06V 20/54* | (2022.01) |
| *G06V 20/70* | (2022.01) |

(52) U.S. Cl.
CPC .............. *G06V 10/26* (2022.01); *G06V 20/54* (2022.01); *G06V 20/70* (2022.01); *G06T 2207/10024* (2013.01); *G06T 2207/20081* (2013.01)

(58) Field of Classification Search
CPC . G06T 2207/20081; G06T 2207/10028; G06T 2207/20084; G06T 2207/30236; G06V 10/26; G06V 20/54; G06V 20/70; G06V 10/774; G06V 10/82; G06V 20/56
See application file for complete search history.

(56) References Cited

U.S. PATENT DOCUMENTS

| | | | | |
|---|---|---|---|---|
| 2023/0399015 A1* | 12/2023 | Kothari | .................. | G06V 10/14 |
| 2023/0401745 A1* | 12/2023 | Kothari | ................ | B60W 60/00 |
| 2024/0095928 A1* | 3/2024 | Wang | ........................ | G06T 7/80 |
| 2024/0142587 A1* | 5/2024 | Alismail | ............... | G01S 7/4972 |
| 2024/0142588 A1* | 5/2024 | Alismail | ................ | G01S 17/89 |

OTHER PUBLICATIONS

Su Wang, Shini Zhang, and Xuchong Qiu. "P2O-Calib: Camera-LiDAR Calibration Using Point-Pair Spatial Occlusion Relationship," in 2023 IEEE/RSJ International Conference on Intelligent Robots and Systems (IROS), pp. 1840-1847, 2023 (Year: 2023).*

Zhu, Yufeng, Chenghui Li, and Yubo Zhang. "Online camera-lidar calibration with sensor semantic information." 2020 IEEE International Conference on Robotics and Automation (ICRA). IEEE, 2020. (Year: 2020).*

Bai, Zixuan, Guang Jiang, and Ailing Xu. "LiDAR-camera calibration using line correspondences." Sensors 20.21 (2020): 6319. ( Year: 202).*

Qiu et al., "Pixel-Pair Occlusion Relationship Map (P2ORM): Fomulation, Inference & Application", Jul. 23, 2020 (18 pages).

Li et al., "Automatic Targetless LiDAR-Camera Calibration: A Survey", Research Square, Aug. 31, 2022, Springer Nature (51 pages).

Wang et al., "DOC: Deep OClusion Estimation from a Single Image", Sep. 17, 2016, Springer International Publishing (17 pages).

* cited by examiner

OBTAIN THE IMAGE TO BE PROCESSED — 21

GENERATE ANNOTATED RESULTS OF OCCLUSION RELATIONSHIPS — 23

EXTRACT OCCLUSION EDGE FEATURES — 25

301

3112

3111

3114

3113

MODEL TRAINING METHOD, IMAGE EDGE DETECTION METHOD, AND MULTI-SENSOR CALIBRATION METHOD

This application claims priority under 35 U.S.C. § 119 to patent application no. CN 2022 1112 2906.1, filed on Sep. 15, 2022 in China, the disclosure of which is incorporated herein by reference in its entirety.

The present disclosure relates to the fields of image recognition and multi-sensor calibration, particularly involving a model training method, an image edge detection method, a multi-sensor calibration method, a computer program product, and a computer device.

BACKGROUND

Data fusion of lidar and cameras plays a crucial role in the field of autonomous driving. In order to achieve complementary advantages in performance between different types of sensors and deep fusion of data, it is necessary to obtain accurate relative positional relationships between lidar and cameras in advance, i.e., calibrate the extrinsics of lidar and cameras. Since the calibration results directly affect the effectiveness of data fusion, the calibration technology for lidar and cameras is critical for the interaction of information between these two sensors.

Common calibration algorithms for lidar and cameras are based on targets or calibration boards. These algorithms use artificially created targets with known geometric shapes and patterns for calibration. While these methods are widely used in industrial environments, they still have various limitations, such as being time-consuming, only applicable to fixed locations with sufficient space, and being restricted to setup stages, without the flexibility to choose calibration scenes.

Based on this, the topic of interest is currently the development of targetless automatic calibration algorithms for lidar and cameras. A common approach for targetless automatic calibration is motion-based algorithms, where the trajectory of lidar and cameras during vehicle motion is estimated, and the extrinsics between multiple sensors are calculated. However, this method relies on the motion of multiple sensors, and the range measurement errors of lidar and cameras can accumulate in the results, leading to imprecise outcomes. Therefore, there is an urgent need for an improved automatic calibration solution for lidar and cameras, to enhance the accuracy, reliability, and robustness of lidar-camera calibration.

SUMMARY

The present disclosure provides a model training method, an image edge detection method, a multi-sensor calibration method, a computer program product, and a computer device to solve at least some technical problems in the prior art.

In one aspect of the present disclosure, a model training method is provided. The method includes constructing an initial model, obtaining multiple training images, and reference annotation results for each training image. Each training image comprises RGB features and depth features, and the reference annotation results are based on the depth features of the training image and indicate the occlusion relationship between adjacent pixel pairs in the training image. The RGB features of the multiple training images are used as inputs to the initial model, and the reference annotation results corresponding to the input training images are used as outputs of the initial model. The initial model is then trained to obtain a well-trained model.

As a result, the reference annotation generated based on depth features serves as ground truth during the model training process, allowing the trained model to generate annotation results close to the ground truth based on RGB features. This enables the application of the model to generate occlusion relationships between pixel pairs in RGB images.

Optionally, the model training method includes: filtering out pixel points with depth values outside a predetermined range from the reference annotation results; and/or filtering out pixel points belonging to specific object categories from the reference annotation results.

Thus, the model used to generate occlusion relationships for pixel pairs is not only suitable for indoor scenes but also applicable to outdoor scenes. This is because the two filtering steps can respectively filter out distant pixel points and pixel points with rich texture features in the reference annotation results, avoiding the introduction of excessive noise features in the annotation results of occlusion relationships generated using the model.

Optionally, the model training method includes generating the reference annotation results based on the depth features.

Optionally, the generation of the reference annotation results based on depth features also includes determining whether the depth features are dense. If they are, generating the reference annotation results based on the depth features; if not, upsampling the depth features to obtain dense depth features and generating the reference annotation results based on the dense depth features.

Thus, when the depth features are sparse, such as those from LIDAR data, completing the depth features to obtain dense depth features allows for more complete and higher-resolution reference annotation results, meeting the requirements of the model for processing RGB images.

Optionally, generating the reference annotation results based on depth features includes comparing the relative magnitude of the difference between the depth values of two adjacent pixels in any adjacent pixel pair in the training image and a predetermined threshold. The occlusion relationship of the adjacent pixel pair is determined based on the comparison results.

This allows for the automatic generation of reference annotation results, reducing the time and effort required for manual annotation. The generated reference annotation results include occlusion relationships of pixel pairs at the 3D edges of the training image, avoiding mislabeling pixel pairs at 2D pattern edges as adjacent pixel pairs with occlusion relationships.

Optionally, generating the reference annotation results based on depth features includes generating normal images of the training image based on the depth features; generating the annotation results of occlusion relationships for adjacent pixel pairs in the training image based on the depth features and normal images. These annotation results serve as the reference annotation results.

Hence, the reference annotation results generated based on depth features and normal images consider not only the depth values of each pixel in the training image but also the normal vectors of each pixel, resulting in more accurate reference annotation results.

On the other hand, the examples of the present disclosure also provide a method for image edge detection, including: obtaining the image to be processed; using a trained model obtained according to the model training method of the present disclosure to generate annotated results of occlusion relationships for adjacent pixel pairs in the image to be processed; based on the annotation results, extracting occlusion edge features in the image to be processed, where the occlusion edge features include the position and orientation of occlusion edges.

Thus, the occlusion edge features not only contain positional information but also orientation information, providing more comprehensive information about occlusion edge attributes. This is beneficial for accurately identifying different occlusion edges. Additionally, the extracted occlusion edge features in the image to be processed are determined based on pixel-level occlusion relationships, ensuring higher accuracy and resolution in terms of the position, shape, and occlusion orientation of the occlusion edge features. Moreover, since the model is trained on ground truth generated based on depth features, the image edge detection method can identify 3D occlusion edge features or depth-discontinuous edge features, avoiding misidentifying 2D pattern edges or depth-continuous edge features as occlusion edge features.

On the other hand, the examples of the present disclosure also provide a calibration method for multi-sensor systems, including: obtaining image data from a first sensor and 3D point cloud data from a second sensor, where the 3D point cloud data is synchronized with the image data in terms of acquisition time; based on occlusion relationships of adjacent pixel pairs in the image data, extracting first occlusion edge features from the image data, where the first occlusion edge features include the position and orientation of the first occlusion edges; based on occlusion relationships of adjacent point cloud points in the 3D point cloud data, extracting second occlusion edge features from the 3D point cloud data, where the second occlusion edge features include the position and orientation of the second occlusion edges; matching the multiple pixel points included in the first occlusion edge and the multiple point cloud points included in the second occlusion edge to obtain pairs of successful matches consisting of pixel points and point cloud points; based on the multiple pairs of points, obtaining the transformation relationship between the coordinate system of the first sensor and the coordinate system of the second sensor for calibration of the first sensor and the second sensor.

Optionally, the extracted first occlusion edge features include first occlusion edges with multiple orientations located at multiple positions, and the extracted second occlusion edge features include second occlusion edges with multiple orientations located at multiple positions. The calibration method includes matching first occlusion edges and second occlusion edges that are close in position and have the same orientation, obtaining pairs of successful matches consisting of pixel points and point cloud points.

Thus, both the first occlusion edge features extracted from the image data of the first sensor and the second occlusion edge features extracted from the 3D point cloud data of the second sensor include information about the position and orientation of their respective occlusion edges. Consequently, during the process of matching the first and second occlusion edges, efficient and accurate matching can be achieved by combining position and orientation information. This avoids the situation where only position information is available, leading to erroneous matching of occlusion edges with different orientations and affecting the generation of incorrect pairs. This significantly enhances the efficiency and reliability of multi-sensor calibration.

Optionally, obtaining 3D point cloud data from the second sensor includes obtaining 3D point cloud data in the first sensor's field of view from a single frame of 3D point cloud data collected by the second sensor, based on the initial calibration of the first and second sensors.

Thus, multi-sensor calibration is achieved based on point cloud data corresponding to the portion of the 3D point cloud data that aligns with the 2D image data from the first sensor.

Optionally, the method utilizes the image edge detection method according to the examples of the present disclosure to extract the first occlusion edge features. Alternatively, the method employs manual annotation to generate occlusion relationships for adjacent pixel pairs in the image data. Based on the generated occlusion relationships, the first occlusion edge features are extracted.

This ensures that the extracted first occlusion edge features include 3D occlusion edge features or depth-discontinuous edge features in the image data, avoiding misidentifying 2D pattern edges or depth-continuous edge features as the first occlusion edge features. This prevents the introduction of noise in the matching process between the first and second occlusion edges, enhancing the authenticity of the extracted first occlusion edge features and significantly improving the efficiency and reliability of multi-sensor calibration.

Optionally, the calibration method comprises: annotating the occlusion relationships of adjacent point cloud points in the 3D point cloud data based on the difference in depth values of adjacent point cloud points; extracting the second occlusion edge features in the 3D point cloud data based on the annotated occlusion relationships of the adjacent point cloud points.

As a result, the second occlusion edge features in the 3D point cloud data are acquired using logic similar to that of the first occlusion edge features in the image data. This enhances the stability of matching between the first and second occlusion edge features and consequently improves the stability of the multi-sensor calibration method.

On the other hand, examples of the present disclosure also provide a computer program product. The computer program product includes a computer program that, when executed by a processor, implements the model training method, image edge detection method, or multi-sensor calibration method according to examples of the present disclosure.

Furthermore, examples of the present disclosure also provide a computer-readable storage medium having executable code stored thereon. The executable code, when executed, implements the model training method, image edge detection method, or multi-sensor calibration method according to examples of the present disclosure.

Additionally, examples of the present disclosure provide a computer device comprising a processor, memory, and a computer program stored on the memory. The computer program, when executed by the processor, implements the model training method, image edge detection method, or multi-sensor calibration method according to examples of the present disclosure.

BRIEF DESCRIPTION OF THE DRAWINGS

Referring to the accompanying drawings, examples of the present disclosure are described in more detail to better understand the principles, features, and advantages of the present disclosure. The drawings include.

DETAILED DESCRIPTION

In order to make the above objectives, features, and beneficial effects of the present disclosure more clearly and easily understood, specific examples of the present disclosure will be described in detail in conjunction with the accompanying drawings. The various examples described in this specification are described in a progressive manner, with each example focusing on the differences from other examples. Similar or identical parts between different examples can be cross-referenced as needed.

It should be understood that in this document, terms such as "first," "second," etc., are used for descriptive purposes only and should not be construed as indicating or implying relative importance. Furthermore, such terms should not be understood as implying a specific quantity of the indicated technical features. Features described with "first," "second," etc., can explicitly or implicitly represent the inclusion of at least one of that feature.

Figure 1:
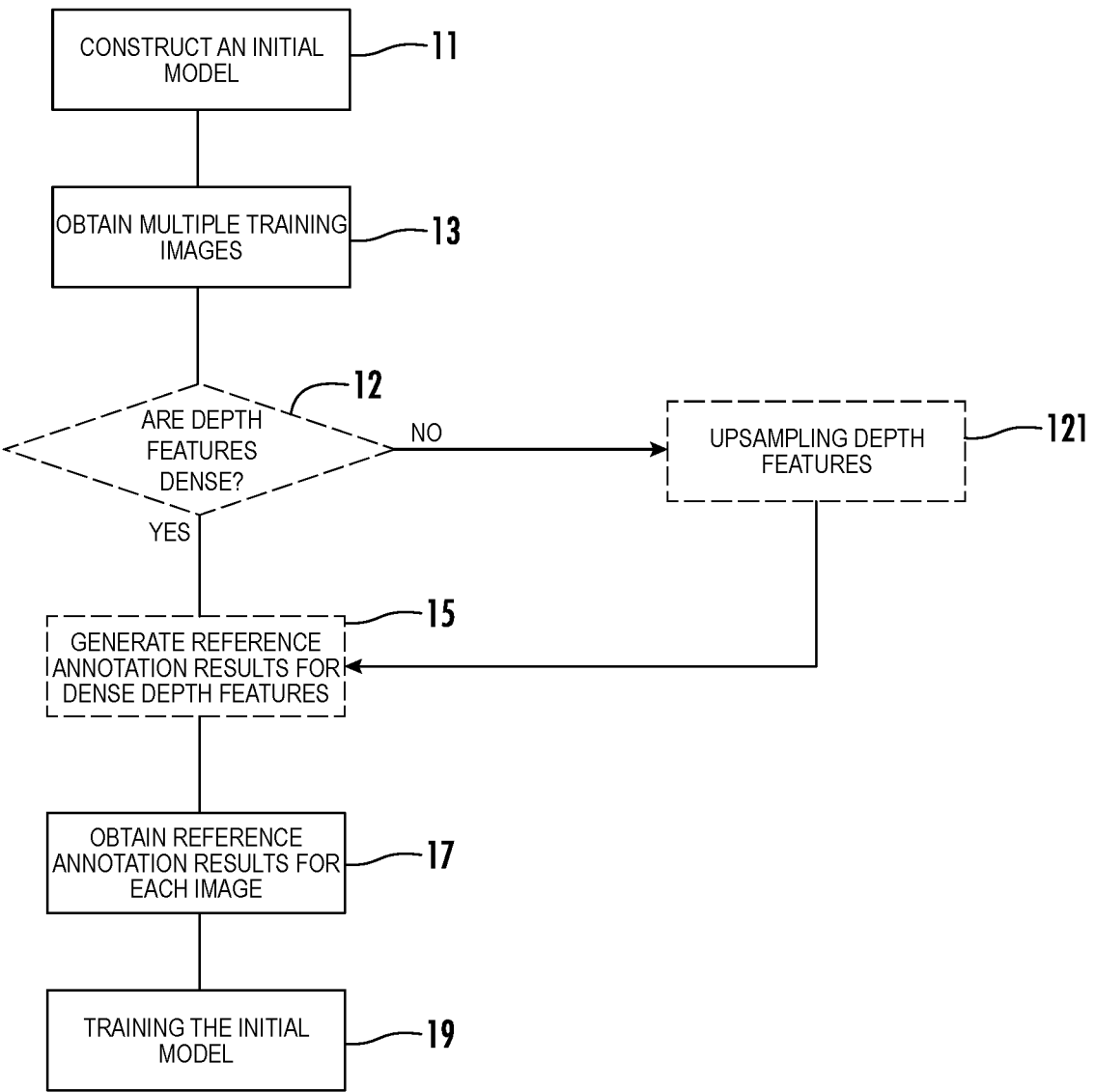
FIG. 1 illustrates a schematic diagram of the process of a model training method according to one example of the present disclosure.

Referring to FIG. 1, FIG. 1 illustrates a schematic diagram of a model training method according to one example of the present disclosure.

In some examples, the model training method comprises the following steps:

Step 11: constructing an initial model;

Step 13: obtaining multiple training images, each training image comprising RGB features and depth features;

Step 17: obtaining reference annotation results for each training image, where the reference annotation results are annotations of occlusion relationships between adjacent pixel pairs in the training image, generated based on the depth features of the training image;

Step 19, using the RGB features of the multiple training images as inputs to the initial model, using the reference annotation results corresponding to the input training images as outputs of the initial model, and training the initial model to obtain a well-trained model.

In some examples, the initial model constructed in step 11 can employ an architecture based on ResNet, U-Net, an autoencoder, or any combination thereof. The encoder of the initial model can adopt the ResNet-50 architecture, where the ResNet-50 model is pre-trained on ImageNet. Other layers or blocks in the initial model can have random parameters.

Specifically, the initial model may include multiple convolutional blocks, residual convolutional blocks, and deconvolutional layers cascaded in a certain order. Skip-connections or residual connections are introduced between multiple layers/blocks, for instance, by combining the output of a certain layer in the network with the output of a layer located upstream of that layer through concatenation, which serves as the output of that layer. By adopting a ResNet or U-Net architecture enhanced with skip-connections, data propagation between layers is facilitated to some extent. This enables the initial model, during the upsampling process at each level, to fuse feature maps at corresponding positions in the encoder across channels. Through the fusion of low-level and high-level features, the network can retain more high-resolution and detailed information contained in the high-level feature maps, thereby enhancing the accuracy of image segmentation.

In some examples, obtaining multiple training images in step 13 comprise: acquiring images captured from an image sensor. The image sensor can be an onboard camera or onboard camcorder, and the training images can include image data from traffic road scenes captured by image sensors on the vehicle side.

In some examples, the training images are RGB-D images, and the depth features in the training images can come from depth cameras or laser radars.

In some examples, the RGB features and depth features in step 13 can be either RGB images and the corresponding depth images to the RGB images, or they can be the information of RGB channels and depth channels included in RGBD images. The RGB features and depth features may not necessarily be feature values.

In some examples, step 19 may comprise: for each training image from the multiple training images, inputting the RGB features of the training image into the initial model, generating initial annotation results for adjacent pixel pairs in the training image based on the initial model, adjusting the initial model based on the difference between the initial annotation results and the reference annotation results for the training image, and continuing to adjust the model based on the adjusted model and the multiple training images until a well-trained model is obtained.

Figure 2:
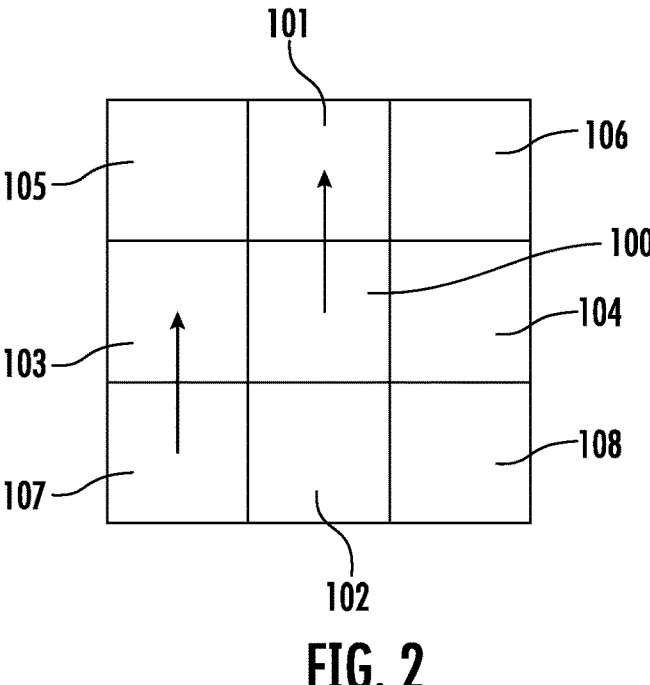
FIG. 2 illustrates a schematic diagram depicting the positional relationships between any pixel in a training image and multiple adjacent pixels in its vicinity, according to one example of the present disclosure.

In some examples, step 19 may comprise: inputting one training image from the plurality of training images into the initial model, utilizing the initial model to generate initial annotation results for occlusion relationships between each pixel and the four or eight pixels directly adjacent to it within its neighborhood in the one training image based on RGB features of the one training image. As shown in FIG. 2, the four pixels directly adjacent to each pixel 100 within its neighborhood include: The four neighboring pixels 101, 102, 103, and 104 located in the upper, lower, and lower directions of the pixels, each of which is directly adjacent within the pixel 100 neighborhood includes eight adjacent pixels 101, 102, 103, 104, 105, 106, 107, and 108 located in the upper, lower, right, upper, right, and lower right directions of the pixels.

In some examples, adjustment of the initial model based on the difference between the initial annotation results and reference annotation results may comprises: calculating the residual between the initial annotation results and the reference annotation results, and updating the parameters of the initial model based on the residual. The initial annotation results and reference annotation results used for comparison correspond to the same training image. In other examples, the initial annotation results may not be generated, and other mechanisms can be employed to update the parameters of the initial model based on ground truth provided by the reference annotation results.

In some examples, the steps for further adjusting the model based on the adjusted model and the plurality of training images comprises: utilizing the adjusted model to generate initial annotation results for occlusion relationships between adjacent pixel pairs within one training image from the plurality of training images based on RGB features of the one training image, adjusting the adjusted model again based on the residual between the initial annotation results and the reference annotation results. Such an adjustment process can be iterated multiple times, and the termination conditions for iterative adjustment can be a predetermined number of iterations or the residual being within a predetermined range. After the iterative adjustment process concludes, a trained model is obtained, which is used for generating occlusion relationships between pixel pairs in images.

In some examples, the method may further comprise step 15, where the reference annotation results are generated based on the depth features.

In some examples, step 15 comprises: comparing the relative magnitude of the difference between the depth values of the two adjacent pixels included in any adjacent pixel pair within the training image with a predetermined threshold, and annotating the occlusion relationship of the adjacent pixel pair based on the comparison result. Specifically, all pixels within the training image can be traversed, generating reference annotation results for occlusion relationships between each pixel and the four or eight pixels directly adjacent to it within its neighborhood based on the depth features. The positional relationships between each pixel and its four or eight directly adjacent pixels within its neighborhood can be referenced as described in the previous description of the example illustrated in FIG. 2. By individually comparing the magnitude relationship between the difference in depth values of each pixel and multiple pixels directly adjacent to it in its surrounding neighborhood and the predetermined threshold, the occlusion relationship for each pair of adjacent pixels can be determined. If the difference in depth values of any pair of adjacent pixels is greater than the predetermined threshold, an occlusion relationship between that pair of adjacent pixels is determined; otherwise, there is no occlusion relationship.

In some examples, the preset threshold is determined based on one or more of the following parameters: the depth values of the two adjacent pixel points, the normal vectors of the two adjacent pixel points, intrinsic parameters of the image sensor used to acquire the training images (such as camera focal length), and the angle between the normal vectors of the two adjacent pixel points and the optical axis of the image sensor.

As a result, the reference annotation results can be automatically generated based on depth features, reducing the time and effort required for manual annotation. The generated reference annotation results include occlusion relationships between pixel pairs at the 3D edges of the training images, avoiding the misannotation of occlusion relationships between pixel pairs at the 2D pattern edges, which usually have small depth differences and are typically less than the preset threshold.

Figure 3:
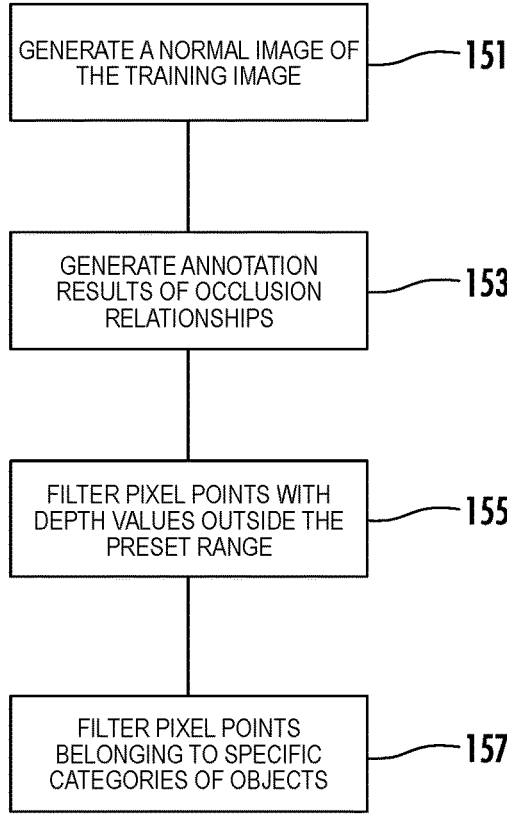
FIG. 3 illustrates a schematic diagram of the process of a method for generating reference annotation results according to one example of the present disclosure.

Referring to FIG. 3, FIG. 3 illustrates a flowchart of a method for generating reference annotation results according to one example of the present disclosure.

In some examples, the method for generating reference annotation results may comprise: step 151, generating a normal image of the training image based on the depth features, step 153, generating annotation results of occlusion relationships between adjacent pixel pairs in the training image based on the depth features and the normal image, as the reference annotation results. The normal image includes normal vectors of individual pixels in the training image.

Thus, the reference annotation results generated based on depth features and normal images not only consider the depth values of each pixel in the training image but also take into account the normal vectors of each pixel, making the reference annotation results more accurate, as different pixels may have different normal vectors, which could affect the preset threshold. In some examples, different preset thresholds can be set for different pixels based on the angles between the depth values and normal vectors of the pixels and the optical axis of the image sensor in the training image, making the annotation of occlusion relationships between adjacent pixel pairs more accurate.

In some examples, the method for generating reference annotation results may further comprise: Steps 155 and/or 157. In step 155, pixel points with depth values outside the preset range in the reference annotation results are filtered out (e.g., using a depth filter). The preset range is determined based on the maximum detection distance of the sensor used to obtain the depth features of the training images. When the reference annotation results contain pixel points with depth values greater than the maximum detection distance of the sensor, those pixel points are filtered out. In step 157, pixel points belonging to specific categories of objects are filtered out from the reference annotation results (e.g., using a semantic filter). The training images can include annotated data for object categories, such as images that have undergone semantic segmentation or manual annotation. The specific categories may include objects with rich or complex texture features, such as leaves or bushes.

As a result, the model used to generate occlusion relationships between pixel pairs is not only suitable for indoor scenes but also applicable to outdoor scenes, as the filtering steps 155 and 157 can respectively filter out pixel points that are very far away and pixel points with rich texture features, avoiding the introduction of excessive noise in the occlusion relationship annotation results generated using the model.

Continuing to refer to FIG. 1, in some examples, the model training method may also comprise step 12: determining whether the depth features are dense, and if so, performing step 15, which involves generating reference annotation results based on the dense depth features. If not, step 121 is executed: upsampling the depth features to obtain dense depth features, then performing step 15 to generate reference annotation results based on the dense depth features.

Specifically, in step 12, the density of the depth features can be determined based on whether there are holes in the regions of interest (ROIs) in the depth image. Generally, if the depth feature originates from a depth camera, it is considered dense. Conversely, if the depth feature comes from a laser radar, it is considered sparse and requires completion. The completion of the sparse depth feature can be achieved using a deep learning network designed for this purpose.

In some examples, both the reference annotation results and the initial annotation results include annotations for occluding pixels and pixels that occlude in the training images, as well as annotations for the occlusion direction. The occlusion direction indicates the direction from the occluding pixel to the occluded pixel.

Referring to FIG. 2, for any pixel 100 in the training image, its occlusion relationship with adjacent pixels, such as 101, can fall into three cases: pixel 100 occludes pixel 101 (represented as 1), pixel 100 is occluded by pixel 101 (represented as −1), and there is no occlusion between pixel 100 and pixel 101 (represented as 0). Therefore, for any pixel 100, considering the occlusion relationship with the 8 directly neighboring pixels (101 to 108), the annotation result can be a vector containing 8 elements. Each element corresponds to the occlusion relationship between pixel 100 and one of its directly neighboring pixels. The values of these elements can be 1, −1, or 0. For a training image containing H×W pixels, the annotation result is a tensor of size H×W×8. This representation of occlusion relationships as 1, −1, or 0 not only conveys information about which pixel occludes and which pixel is occluded among adjacent pixel pairs but also includes information about the occlusion direction since the occlusion direction is from the occluding pixel to the occluded pixel, and the positions of the two adjacent pixels are known. if the occlusion relationship between pixel 100 and pixel 101 is annotated as 1, the occlusion direction between pixels 100 and 101 is from pixel 100 to pixel 101 (as indicated by the arrow in FIG. 2). If the occlusion relationship between pixel 100 and pixel 102 is annotated as 0, there is no occlusion between pixels 100 and 102. Similarly, for example, if the occlusion relationship between pixel 103 and adjacent pixel 107 is annotated as −1, the occlusion direction between pixels 103 and 107 is from pixel 107 to pixel 103 (as indicated by the arrow in FIG. 2).

The training method of the examples of the present disclosure utilizes reference annotation results generated based on depth features as ground truth in the model training process. Supervised learning methods are employed to train the model to generate annotation results for pixel pairs in RGB images that closely resemble the ground truth. This enables the model to infer occlusion relationships between pixels in RGB images.

On the other hand, the examples of the present disclosure also provide a method for image edge detection.

Figure 4:
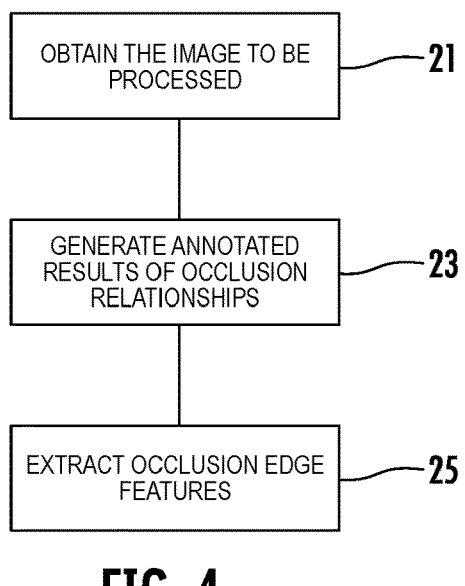
FIG. 4 illustrates a schematic diagram of the process of a method for image edge detection according to one example of the present disclosure.

Referring to FIG. 4, a schematic diagram of the process of image edge detection method according to an example of the present disclosure is shown. In some examples, the method for image edge detection comprises the following steps:

Step 21: obtaining the image to be processed.

Step 23, utilizing the trained model obtained through the training method according to the aforementioned example of the present disclosure to generate annotated results of occlusion relationships in adjacent pixel pairs in the image to be processed.

Step 25: extracting occlusion edge features in the image to be processed based on the annotation results, wherein the occlusion edge features include the position and orientation of occlusion edges.

In some examples, in Step 21, the image to be processed is an RGB image; and/or the image to be processed is obtained from images captured in traffic road scenes using image sensors (e.g., cameras or cameras). The image to be processed may not include depth features. Therefore, in Step 23, the model generates annotated results of occlusion relationships in adjacent pixel pairs in the image to be processed based on the information of the RGB image.

In some examples, the annotated results generated in Step 23 comprises: annotations for occluding pixels and obscured pixels in adjacent pixel pairs with occlusion relationships in the image to be processed, as well as annotations for occlusion directions. The occlusion direction is indicated by the occluded pixel pointing towards the obscured pixel.

In some examples, in Step 25, based on the annotation results, extracting occlusion edge features in the image to be processed comprises: determining the position of the occlusion edge features based on the positions of occluded pixels included in the annotated results, and determining the orientation of the occlusion edge features based on the annotations of occlusion directions in the adjacent pixel pairs included in the annotated results.

In some examples, the occlusion edge features consist of pixel points annotated as occluded pixels, and the orientation of the occlusion edge features is the same as the orientation of the pixel points composing the occlusion edge features.

In some examples, the occlusion edge features include multiple segmented occlusion edge features, and the occlusion direction of adjacent pixel pairs near each segmented occlusion edge feature is the same. The occlusion direction of adjacent pixel pairs near different segmented occlusion edge features may differ. Each extracted segmented occlusion edge feature can be composed of occluded pixels from multiple sets of adjacent pixel pairs with occlusion relationships. When the occlusion direction of multiple sets of adjacent pixel pairs is horizontally to the right, the orientation of the segmented occlusion edge feature is a right occlusion edge. When the occlusion direction of multiple sets of adjacent pixel pairs is horizontally to the left, the orientation of the segmented occlusion edge feature is a left occlusion edge. When the occlusion direction of multiple sets of adjacent pixel pairs is vertically upwards, the orientation of the segmented occlusion edge feature is an upper occlusion edge. When the occlusion direction of multiple sets of adjacent pixel pairs is vertically downwards, the orientation of the segmented occlusion edge feature is a lower occlusion edge. Each segmented occlusion edge feature comprises consecutively arranged pixel points. Multiple segmented occlusion edge features can form a continuous occlusion edge. Each segmented occlusion edge feature can have linear characteristics, and the formed continuous occlusion edge can have arc characteristics or polygonal characteristics. Arc characteristics can also be obtained through smoothing based on polygonal characteristics.

In some examples, step 23 comprises: generating annotation results of occlusion relationships of adjacent pixel pairs arranged in different directions in the image to be processed, based on the well-trained model; extracting occlusion edge features with different orientations in the image to be processed, based on the annotation results. The different arrangement directions of adjacent pixel pairs include at least two of the following directions: horizontal direction, vertical direction, diagonal direction, and anti-diagonal direction of the image. The specific directions can refer to the arrangement directions of adjacent pixel pairs formed by each pixel and its eight neighboring pixels in the model training method of the aforementioned examples, which are not reiterated here. The annotated results of occlusion relationships of adjacent pixel pairs arranged in different directions can be generated simultaneously. Since the arrangement direction of adjacent pixel pairs affects their occlusion directions, and the orientation of occlusion edge features depends on the occlusion directions of adjacent pixel pairs, generating annotation results of occlusion relationships of adjacent pixel pairs arranged in different directions is beneficial for obtaining comprehensive and accurate information about the orientation of the occlusion edge features.

Therefore, the occlusion edge features not only possess positional information but also orientation information, providing more comprehensive information about the attributes of occlusion edges, which is advantageous for accurately identifying different occlusion edges. Secondly, the extracted occlusion edge features in the image to be processed are determined based on pixel-level occlusion relationships, which results in higher accuracy and resolution in terms of the position, shape, and occlusion orientation of the occlusion edge features. Thirdly, since the model is trained with ground truth generated based on depth features, the image edge detection method can achieve recognition of 3D occlusion edge features or depth-discontinuous edge features, while avoiding misidentifying 2D pattern edges or depth-continuous edge features as occlusion edge features.

Figure 5:
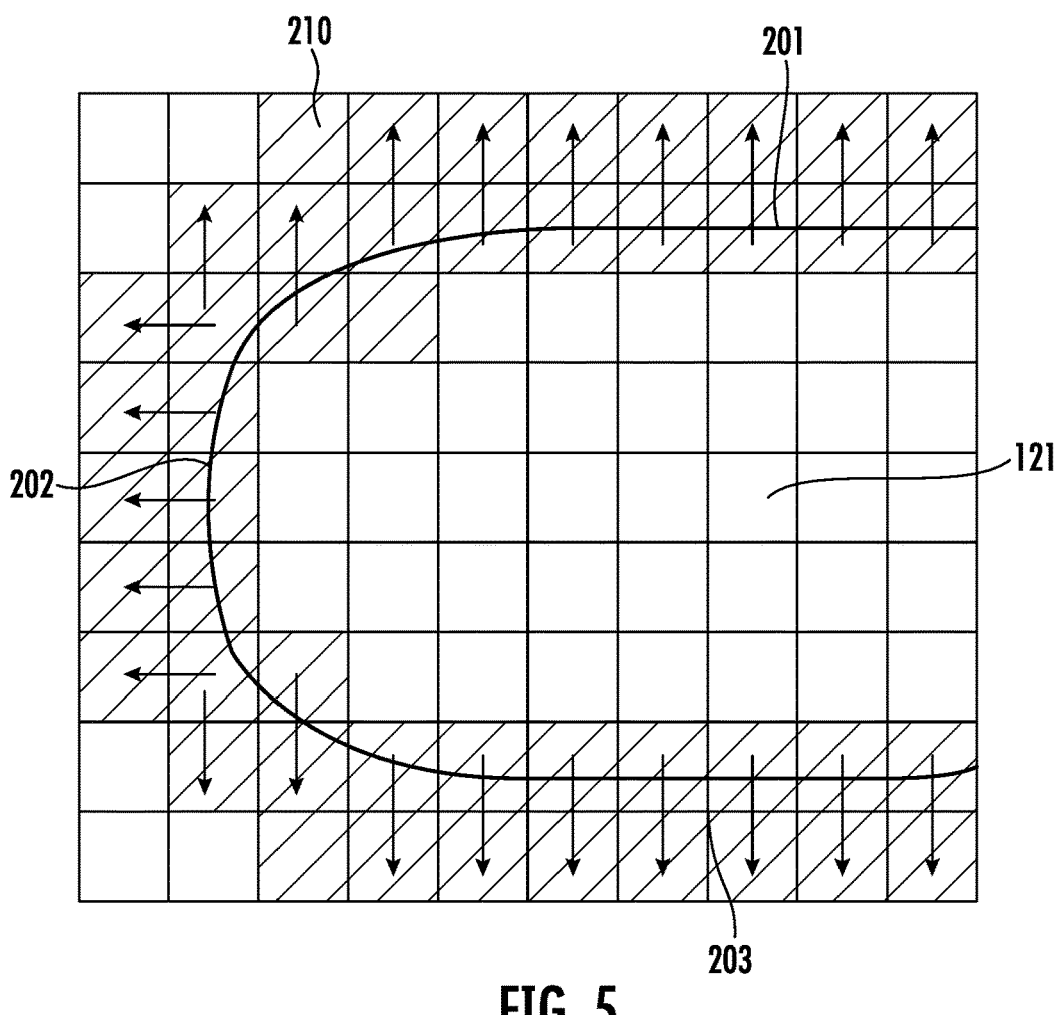
FIG. 5 illustrates a schematic diagram depicting the occlusion relationships between adjacent pixel pairs and extracted occlusion edge features according to one example of the present disclosure.

Referring to FIG. 5, FIG. 5 illustrates a schematic diagram of the occlusion relationship of adjacent pixel pairs and the extracted occlusion edge features according to an example of the present disclosure. The two pixels 210 (shaded pixels) crossed by the arrow in the diagram represent adjacent pixel pairs with occlusion relationships, and the direction of the arrow indicates the occlusion direction of the adjacent pixel pairs. The pixel 211 without shading in the diagram has no occlusion relationship with the surrounding adjacent pixels. It should be noted that FIG. 5 shows the visual representation of annotated results of occlusion relationships of partial adjacent pixel pairs in a region of interest in a processed image, and the actual image edge detection method stores the annotated results in the form of tensors as described earlier. FIG. 5 only shows the occlusion relationships between each pixel and its horizontally and vertically adjacent pixels, without illustrating the occlusion relationships between each pixel and its diagonally and anti-diagonally adjacent pixels. Therefore, as shown in FIG. 5, there are three occlusion directions: vertically upward, vertically downward, and horizontally left. The extracted occlusion edge features include upper occlusion edge 201, left occlusion edge 202, and lower occlusion edge 203.

The inventor has found through research that the main challenge in feature-based calibration between a LiDAR and a camera lies in the differences between the two sensor models. In other words, it is difficult to associate features in camera images, such as pixel gradients, feature points, and edges, with features in LiDAR point clouds. In some feature-based calibration methods, gradient features in camera images, such as edge features based on the Canny algorithm and line features based on the Line Segment Detector (LSD), are associated with edge features in LiDAR frames. However, due to the fact that 2D patterns in images are rarely detected by LiDAR, the feature matching between the 3D point cloud of LiDAR and the 2D image of the camera is based on the assumption that gradient pixels in the camera image only contain 3D edges, not 2D pattern edges. This assumption is not applicable to many scenarios. For example, in the case of a brick wall, Canny features in the camera image include both the edges of the wall and the joints of the bricks, but the LiDAR data can only perceive the edges of the wall. Therefore, this feature-based calibration method requires a good initial value for the extrinsic matrix, otherwise, the calibration algorithm itself will have difficulty accurately performing feature matching between the camera image and the LiDAR point cloud, resulting in incorrect matching results.

Figure 6:
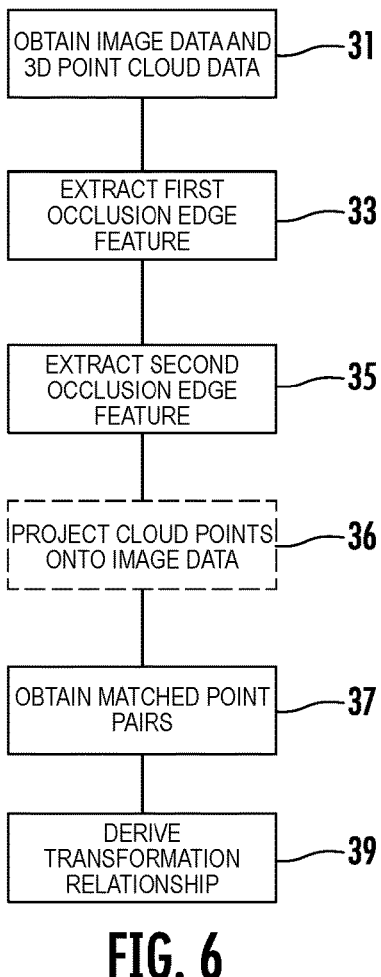
FIG. 6 illustrates a schematic diagram of the process of a method for multi-sensor calibration according to one example of the present disclosure.

To improve the accuracy of data association or matching between images and LiDAR point clouds and take advantage of the benefits of unsupervised automatic calibration methods, the present example of the disclosure also provides a multi-sensor calibration method, as shown in Reference FIG. 6, illustrating the process flow of the multi-sensor calibration method according to an example of the present disclosure.

In some examples, the calibration method for a multi-sensor system comprises:

Step 31, obtaining image data from a first sensor and 3D point cloud data from a second sensor (not shown), where the 3D point cloud data is synchronized with the acquisition time of the image data; Step 33, based on occlusion relationships between adjacent pixel pairs in the image data, extracting the first occlusion edge feature from the image data, where the first occlusion edge feature includes the position and orientation of the first occlusion edge;

Step 35, based on occlusion relationships between adjacent point cloud points in the 3D point cloud data, extracting the second occlusion edge feature from the 3D point cloud data, where the second occlusion edge feature includes the position and orientation of the second occlusion edge;

Step 37, matching the multiple pixel points comprising the first occlusion edge (not shown) and the multiple point cloud points comprising the second occlusion edge, obtaining sets of successfully matched pixel points and point cloud points as pairs;

Step 39, deriving a transformation relationship between the coordinate system of the first sensor and the coordinate system of the second sensor based on the multiple pairs of points, for calibrating the first and second sensors.

Figure 7:
FIG. 7 illustrates the image data from a first sensor according to one example of the present disclosure.
Figure 7:

Referring to FIG. 7, which illustrates a single image data captured from the first sensor according to an example of the present disclosure. In some examples, Step 31 includes obtaining a single RGB image data 301 from the first sensor, and based on the initial calibration of the first and second sensors (e.g., based on mechanical positions and parameters), obtaining 3D point cloud data from a single frame collected by the second sensor that is within the field of view of the first sensor.

In some examples, the first sensor comprises an onboard camera or camera, and it can be positioned in front of, on the side of, or behind the vehicle. The second sensor comprises an onboard LiDAR sensor and can be positioned on top of the vehicle. The relative positions of the first and second sensors are fixed or rigidly connected, and both sensors are located on the same vehicle.

In some examples, Step 33 includes using the image edge detection method described in previous examples of the present disclosure to extract the first occlusion edge feature. Thus, the extracted first occlusion edge feature includes 3D occlusion edge features or depth-discontinuity edge features in the image data, rather than mistakenly identifying 2D pattern edges or depth-continuous edge features in the image data as the first occlusion edge feature. This avoids introducing noise during the matching process between the first and second occlusion edges, affecting the matching results of point pairs. As a result, the extracted first occlusion edge feature is more accurate, significantly enhancing the calibration efficiency and reliability of the multi-sensor system.

In other examples, Step 33 includes extracting the first occlusion edge feature by manually labeling occlusion relationships between adjacent pixel pairs in the image data. The manual labeling of occlusion relationships between adjacent pixel pairs in the image data involves labeling the occlusion relationships between pixel pairs used for segmenting adjacent foreground and background objects based on their positional relationships in the image data. The labeling results are similar to the aforementioned examples, including labeling of occluded pixels and obscured pixels in adjacent pixel pairs with occlusion relationships in the image data, as well as labeling of occlusion directions, where the occlusion direction is from the occluded pixel to the obscured pixel. Based on these manually labeled results, the first occlusion edge feature is extracted from the image data.

In yet other examples, Step 33 includes extracting the first occlusion edge feature by combining the image edge detection method described in previous examples of the present disclosure with the method of manually labeling occlusion relationships between adjacent pixel pairs in the image data.

The specific implementation of Step 33 is not limited to extracting the first occlusion edge feature using the image edge detection method of the aforementioned examples of the present disclosure, and is not limited to generating occlusion relationships of adjacent pixel pairs using the trained model of the aforementioned examples of the present disclosure. Based on the occlusion relationships of adjacent pixel pairs generated by the model, the first occlusion edge feature is extracted. Appropriate methods can be employed to generate occlusion relationships of adjacent pixel pairs and then extract the first occlusion edge feature.

In some examples, the orientation of the first occlusion edge is determined based on the occlusion directions of adjacent pixel pairs near the first occlusion edge; the orientation of the second occlusion edge is determined based on the occlusion directions of adjacent point cloud points near the second occlusion edge.

In some examples, the orientations of both the first occlusion edge and the second occlusion edge can include one or more of the following: left occlusion edge, right occlusion edge, upper occlusion edge, and lower occlusion edge.

Figures 8, 9:
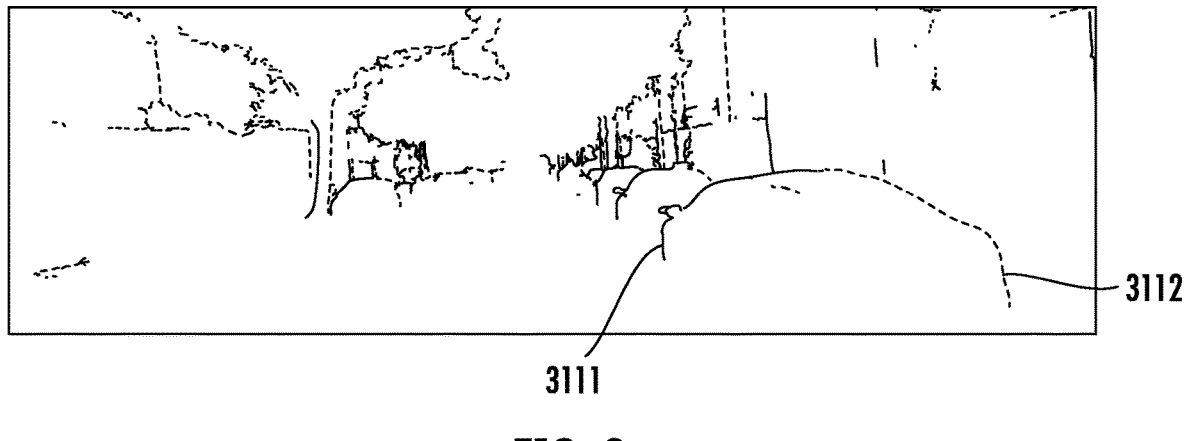
FIG. 8 illustrates the extracted first occlusion edge features with a horizontal orientation from the image data according to one example of the present disclosure.
FIG. 9 illustrates the extracted first occlusion edge features with a vertical orientation from the image data according to one example of the present disclosure.

Referring to FIGS. 8 and 9, FIG. 8 illustrates the extracted first occlusion edge feature with a horizontal orientation in the image data 301 according to an example of the present disclosure, and FIG. 9 illustrates the extracted first occlusion edge feature with a vertical orientation in the image data 301 according to an example of the present disclosure.

In some examples, the first occlusion edge feature extracted in Step 33 includes first occlusion edges with multiple orientations located at multiple positions. As shown in FIG. 8, the first occlusion edge feature with a horizontal orientation (i.e., occlusion direction) includes the first left occlusion edge 3111 (indicated by the black line in FIG. 8) and the first right occlusion edge 3112 (indicated by the white line in FIG. 8). As shown in FIG. 9, the first occlusion edge feature with a vertical orientation includes the first upper occlusion edge 3113 (indicated by the black line in FIG. 9) and the first lower occlusion edge 3114 (indicated by the white line in FIG. 9). It should be noted that the first lower occlusion edge near the ground in FIG. 9 is omitted.

In some examples, the second occlusion edge feature extracted in step 35 includes second occlusion edges with multiple orientations located at multiple positions.

In some examples, the calibration method includes matching the first occlusion edges and second occlusion edges that are located nearby and have the same orientation to obtain multiple sets of successfully matched pairs of pixels and point cloud points (not shown).

Figure 10:
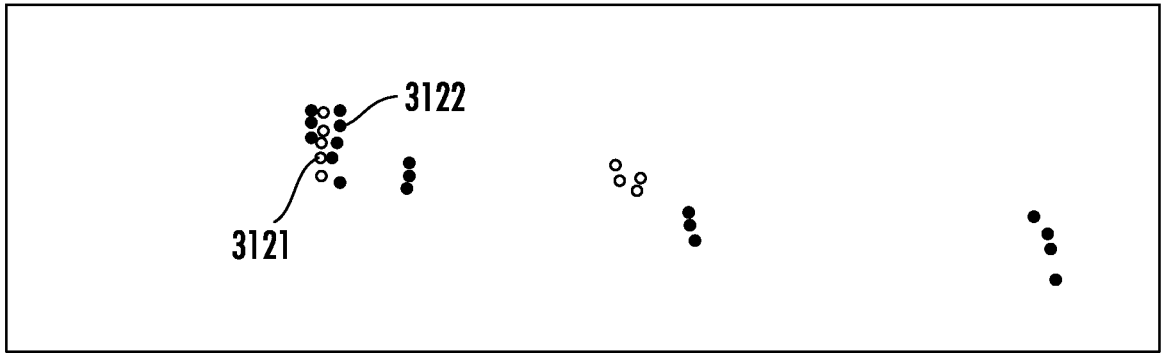
FIG. 10 illustrates the second occlusion edge features with a horizontal orientation extracted from the 3D point cloud data and their second projected occlusion edge features in the image data according to one example of the present disclosure.
Figure 11:
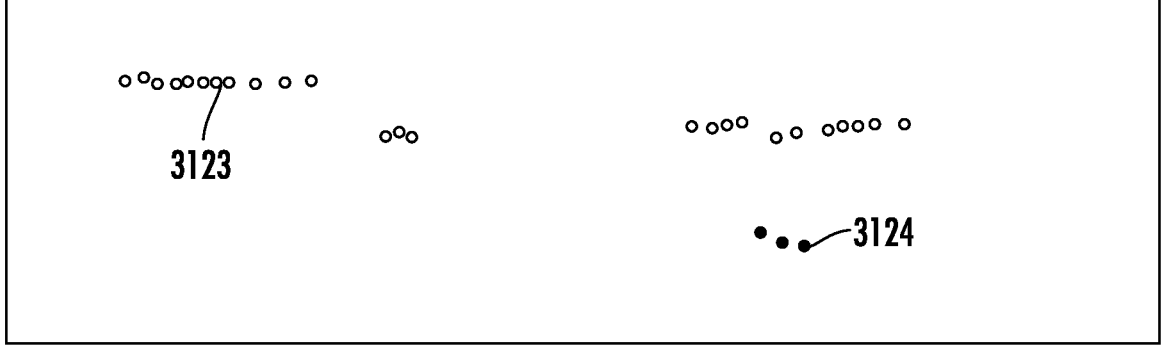
FIG. 11 illustrates the second occlusion edge features with a vertical orientation extracted from the 3D point cloud data and their second projected occlusion edge features in the image data according to one example of the present disclosure.

In some examples, before matching the first occlusion edges and second occlusion edges, the calibration method can further include Step 36: projecting multiple point cloud points included in the second occlusion edges onto the image data to obtain the positions and orientations of corresponding second projected occlusion edges (as shown in FIGS. 10 and 11); matching first occlusion edges with the same orientation as the second projected occlusion edges to obtain multiple sets of successfully matched pairs.

Specifically, in Step 36, the second occlusion edge features, comprising multiple point cloud points, are projected onto the image data to obtain multiple projected pixel points corresponding to the respective multiple point cloud points. This projection can be performed based on Equation (1):

$$s \begin{bmatrix} u \\ v \\ 1 \end{bmatrix} = \begin{bmatrix} f_x & 0 & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \qquad (1)$$

Where the first matrix on the right side of the equation represents the intrinsic parameters of the first sensor, such as a camera, and the second matrix on the right side represents the rotation parameters ($r_{11}$-$r_{33}$) and translation parameters ($t_1$, $t_2$, $t_3$) of the camera (u, v) represent coordinates under the 2D coordinate system of the first sensor and (x, y, z) represents coordinates under the 3D coordinate system of the second sensor.

Referring to FIGS. 10 and 11, FIG. 10 illustrates the second projected occlusion edge feature in the image data for the example of the present disclosure where the orientation of the 3D point cloud data is horizontal. FIG. 11 illustrates the second projected occlusion edge feature in the image data for the example of the present disclosure where the orientation of the 3D point cloud data is vertical. Specifically, the second projected occlusion edge feature includes the second projected left occlusion edge 3121 (occluding towards the left horizontally), the second projected right occlusion edge 3122 (occluding towards the right horizontally), the second projected upper occlusion edge 3123 (occluding upwards horizontally), and the second projected lower occlusion edge 3124 (occluding downwards horizontally).

In some examples, the calibration method includes: matching the first left occlusion edge 3111 from the image data and the second projected left occlusion edge 3121 from the 3D point cloud data, both of which are in close proximity in terms of position; matching the first right occlusion edge 3112 from the image data and the second projected right occlusion edge 3122 from the 3D point cloud data, both of which are in close proximity in terms of position; matching the first upper occlusion edge 3113 from the image data and the second projected upper occlusion edge 3123 from the 3D point cloud data, both of which are in close proximity in terms of position; matching the first lower occlusion edge 3114 from the image data and the second projected lower occlusion edge 3124 from the 3D point cloud data, both of which are in close proximity in terms of position.

In some examples, Step 35 comprises: determining occlusion relationships between adjacent point cloud points in the 3D point cloud data based on differences in depth values; extracting the second occlusion edge features from the 3D point cloud data based on the determined occlusion relationships.

In some examples, Step 35 comprises: determining occlusion relationships of adjacent point cloud points arranged in different directions in the 3D point cloud data based on differences in depth values.

Specifically, the single-frame point cloud captured by the second sensor includes m rings (corresponding to m laser beams) of point cloud points, with each ring of point cloud points comprising n point cloud points. Step 35 includes: determining occlusion relationships of adjacent point cloud points along the horizontal and vertical directions of the laser beams or in the horizontal and vertical directions of 3D space.

In some examples, when annotating occlusion relationships of adjacent point cloud points along the horizontal direction, traverse through each point in each circular point cloud, and for a point cloud point with ID i, assuming its depth value is depth[i], the method for annotating occlusion relationships of adjacent point cloud points along the horizontal direction includes: Performing a first judgment step: Determine whether depth[i] is less than the first depth threshold. If yes, ignore point cloud point i and move to the next point cloud point i+1. If no, perform a second judgment step: Determine whether (depth[i]−depth[i−1]) is greater than the second depth threshold and whether (depth[i+1]−depth[i]) is less than the third depth threshold. If yes, add point cloud point i to the collection of point cloud points on the right occlusion edge. If no, perform a third judgment step: Determine whether (depth[i+1]−depth[i]) is greater than the second depth threshold and whether (depth[i]−depth[i−1]) is less than the third depth threshold. If yes, add point cloud point i to the collection of point cloud points on the left occlusion edge. If no, leave point cloud point i as unannotated with occlusion relationships. Finally, return the collection of point cloud points on the right occlusion edge and the collection of point cloud points on the left occlusion edge. This provides annotated point cloud points with occlusion relationships along the horizontal direction and their occlusion orientations. It is noted that the above judgment conditions are related to the scanning direction of the LiDAR. Depending on whether the LiDAR's scanning direction is clockwise or counterclockwise, the conditions for determining whether a point cloud point belongs to the left occlusion edge or the right occlusion edge may vary.

Here, the first depth threshold, the second depth threshold, and the third depth threshold are all positive values. If the difference between the depth values of two adjacent point cloud points is greater than the second depth threshold, it indicates an occlusion relationship between these two point cloud points. If the difference is less than the third depth threshold, it indicates that these two point cloud points belong to the same object. Due to the uniform angular resolution of the LiDAR, the same values of the second and third depth thresholds can be applied to all point cloud points.

In some examples, the second sensor is a multi-beam LiDAR with multiple beams arranged vertically in 3D space. When annotating occlusion relationships of adjacent point cloud points along the vertical direction, traverse through point cloud points located in different circles at the same acquisition moment (corresponding to multiple point cloud points collected at the same scanning moment of the multi-beam LiDAR), in order to obtain occlusion relationships between two adjacent point cloud points along the vertical direction. The specific method can refer to the aforementioned steps for annotating occlusion relationships along the horizontal direction. The main difference lies in the fact that the point cloud points [i−1], [i], and [i+1] for depth value comparison belong to three beams arranged vertically at the same scanning moment of the multi-beam LiDAR, and the values of the second and third depth thresholds are adjusted according to the vertical angular resolution of the point cloud, which is different from the horizontal angular resolution.

As a result, the second occlusion edge feature in the 3D point cloud data is obtained based on similar logic as the first occlusion edge feature in the image data. This improves the stability of matching between the first occlusion edge and the second occlusion edge features, thus enhancing the stability of the calibration method for the multi-sensor system.

In some examples, step 37 includes utilizing a KD-tree-based method to match multiple pixel points included in the first occlusion edge from the first sensor and multiple point cloud points included in the second occlusion edge from the second sensor, and obtaining at least 4 sets of successfully matched point pairs for calibration of the multi-sensor system. The KD-tree method includes steps of building the tree and performing Nearest-Neighbor Lookup. In some examples, step 39 includes using the obtained multiple sets of point pairs to solve the PnP (perspective-n-point) problem, and obtaining the extrinsics between the coordinate system of the first sensor and the coordinate system of the second sensor, which include the rotation matrix R and the translation matrix T.

In some examples, the calibration method includes iteratively performing steps for calibrating the first sensor and the second sensor. The termination conditions for iteration include the decrease in error during the iteration being less than a preset value or reaching the maximum iteration count.

In some examples, Step 37 includes matching first occlusion edge features from multiple image data acquired from the first sensor and second occlusion edge features from multiple frames of 3D point cloud data acquired from the second sensor to obtain multiple sets of point correspondences. The multiple sets of point correspondences can include matching results between the first occlusion edge features from image data captured at a single acquisition moment and corresponding time-synchronized second occlusion edge features from 3D point cloud data, as well as matching results between the first occlusion edge features from multiple acquisition moments of image data and corresponding time-synchronized second occlusion edge features from 3D point cloud data. Each frame of 3D point cloud data in the multiple frames of 3D point cloud data comprises 3D point cloud data corresponding to multiple beams of light at a specific acquisition moment.

As a result, the first edge features extracted from image data of the first sensor and the second edge features extracted from 3D point cloud data of the second sensor both include information about the positions and orientations of their respective occluded edges. This allows for efficient and accurate matching of the first occluded edge with the second occluded edge during the matching process, combining both position and orientation information. This prevents the erroneous matching of occluded edges with different orientations due to having only position information, which could result in generating incorrect point pairs and affecting the calibration results of multiple sensors. Furthermore, the transformation relationship between the coordinate system of the first sensor and the coordinate system of the second sensor is obtained through accurate matching of feature point pairs. The calibration results of the multiple sensors exhibit higher reliability and robustness, suitable for various scenarios.

It should be noted that the occlusion relationships of neighboring pixel pairs involved in the model training method, image edge detection method, and multi-sensor calibration method of the examples of the present disclosure can be understood as reflecting the occlusion relationships between planes or objects where adjacent pixel pairs in the image correspond to points in the actual scene. Whether in 2D image data or 3D point cloud data, the orientation of the occlusion edge features reflects the occlusion direction between objects on either side of the occluded edge. For instance, when the orientation of an occluded edge feature is a right occluded edge feature, it indicates that the pixels or objects to the left of this occluded edge feature occlude the objects located to the right of this occluded edge feature. The term "occluded edge feature" is distinct from the existing "edge feature" detection. In addition to detecting the position of occluded edges, the method of the examples of the present disclosure also detects the orientation of occluded edges. Occluded edges are composed of pixels used to separate foreground and background objects, thus the occluded edge features are used to segment different objects, avoiding the inclusion of edge features from the same object or 2D patterns (such as joints between bricks in the aforementioned brick wall or tree shadows on the ground). The terms "foreground object" and "background object" are relative and mainly depend on whether the depth values are continuous. Different scenes can set different threshold values for judging the continuity of depth values. Taking the example of a right occluded edge feature, the pixels or objects to the left of this occluded edge feature are considered foreground objects relative to the objects on the right side of this occluded edge feature, and the pixels or objects to the right of this occluded edge feature are considered background objects relative to the objects on the left side of this occluded edge feature. When the occluded edge feature is composed of occluded pixels from neighboring pixel pairs with occlusion relationships, the orientation of the occlusion edge feature also reflects the edge attributes of the object it belongs to. For example, when the orientation of an occluded edge feature is a right occluded edge feature, it indicates that the occluded edge belongs to the right edge of its corresponding object. The annotated neighboring pixel pairs with occlusion relationships in the model training method, image edge detection method, and multi-sensor calibration method of the examples of the present disclosure can be located on two adjacent foreground objects, or respectively on adjacent foreground and background objects, or respectively on two adjacent background objects.

On the other hand, the examples of the present disclosure also provide a computer program product, which includes a computer program. When executed by a processor, the computer program implements the model training method, image edge detection method, or multi-sensor calibration method according to the examples of the present disclosure.

Furthermore, the examples of the present disclosure also provide a computer-readable storage medium, storing executable code. When executed, the executable code implements the model training method, image edge detection method, or multi-sensor calibration method according to the examples of the present disclosure.

Additionally, the examples of the present disclosure also provide a computer device, comprising a processor, memory, and a computer program stored in the memory. When executed by the processor, the computer program implements the model training method, image edge detection method, or multi-sensor calibration method according to the examples of the present disclosure.

For example, the computer-readable storage medium can include but is not limited to Random Access Memory (RAM), Read-Only Memory (ROM), Electrically-Erasable Programmable Read-Only Memory (EEPROM), Static Random Access Memory (SRAM), hard disk, flash memory, and so on.

The above-described specific examples of the disclosure have been described. Other examples are within the scope of the appended claims. In some cases, the actions or steps described in the claims can be performed in a different order from that in the examples and still achieve the desired results. Moreover, the processes depicted in the drawings do not necessarily require a specific sequence or continuous sequence to achieve the desired results. In some embodiments, multitasking and parallel processing are also possible or advantageous.

Not all steps and units in the above processes and system structures are necessary. Some steps or units can be omitted based on actual needs. The apparatus structures described in the above examples can be physical structures or logical structures. That is, some units may be implemented by the same physical entity, while some units may be implemented by multiple physical entities or by certain components in multiple independent devices working together. The interpretation of embodiments mentioned earlier is only described within the framework of the examples. Different features of different embodiments can be freely combined as long as they are technically meaningful, and similar parts between different examples can reference each other without departing from the framework of the present disclosure. The above has described the examples in detail. Clearly, the above description and the examples shown in the drawings should be understood as illustrative and not limiting to the present application. For those skilled in the art, various modifications or variations can be made to the examples without departing from the spirit of the present application. These modifications or variations do not depart from the scope of the present application.

What is claimed is:

1. A calibration method for multiple sensors, comprising:
   obtaining image data from a first sensor and 3D point cloud data from a second sensor, wherein the 3D point cloud data is synchronized with an acquisition time of the image data;
   extracting a first occlusion edge feature from the image data based on occlusion relationships between adjacent pixel pairs in the image data, wherein the first occlusion edge feature includes a position and orientation of the first occlusion edge;
   extracting a second occlusion edge feature from the 3D point cloud data based on occlusion relationships between adjacent point cloud points in the 3D point cloud data, wherein the second occlusion edge feature includes a position and orientation of the second occlusion edge;
   matching multiple pixel points included in the first occlusion edge and multiple point cloud points included in the second occlusion edge to obtain multiple successfully matched pairs of points composed of pixel points and point cloud points; and obtaining a transformation relationship between a coordinate system of the first sensor and the coordinate system of the second sensor based on the multiple pairs of points, for calibrating the first sensor and the second sensor.

2. The calibration method according to claim 1, wherein obtaining the 3D point cloud data from the second sensor comprises:

based on an initial calibration of the first sensor and the second sensor, obtaining 3D point cloud data from a single frame acquired by the second sensor that is within a field of view of the first sensor.

3. The calibration method according to claim 2 further comprising:

extracting the first occlusion edge feature by (i) obtaining an image to be processed, (ii) employing a trained model to generate annotation results for occlusion relationships in adjacent pixel pairs in the image to be processed, and (iii) extracting occlusion edge features from the image to be processed based on the annotation results, wherein the occlusion edge features comprise the positions and orientations of occlusion edges; or using a method of manual annotation to generate occlusion relationships between adjacent pixel pairs in the image data, and extracting the first occlusion edge feature based on the generated occlusion relationships in the adjacent pixel pairs.

4. The calibration method according to claim 3 further comprising:

projecting multiple point cloud points included in the second occlusion edge onto the image data to obtain the positions and orientations of corresponding projected occlusion edges; and matching first occlusion edges with a same orientation as the projected occlusion edges to obtain multiple successfully matched pairs of points.

5. The calibration method according to claim 3, wherein:

the annotation results comprise: annotations for occluding pixels and annotations for occluded pixels, and occlusion direction annotations for adjacent pixel pairs with occlusion relationships in the image to be processed, wherein the occlusion direction indicates the direction from the occluding pixel to the occluded pixel; and extracting occlusion edge features from the image to be processed based on the annotation results comprises: determining the positions of the occlusion edge features based on locations of occluding pixels included in the annotation results, and determining the orientations of the occlusion edge features based on the occlusion direction annotations for adjacent pixel pairs included in the annotation results.

6. The calibration method according to claim 5, wherein the occlusion edge features are composed of occluding pixels from multiple sets of adjacent pixel pairs in an occlusion relationship;

when the occlusion directions of the multiple sets of adjacent pixel pairs in an occlusion relationship are horizontally pointing right, the orientation of the occlusion edge feature is a right occluded edge;

when the occlusion directions of the multiple sets of adjacent pixel pairs in an occlusion relationship are horizontally pointing left, the orientation of the occlusion edge feature is a left occluded edge;

when the occlusion directions of the multiple sets of adjacent pixel pairs in an occlusion relationship are vertically pointing upward, the orientation of the occlusion edge feature is an upper occluded edge; and when the occlusion directions of the multiple sets of adjacent pixel pairs in an occlusion relationship are vertically pointing downward, the orientation of the occlusion edge feature is a lower occluded edge.

7. The calibration method according to claim 3, further comprising:

generating annotation results of occlusion relationships of adjacent pixel pairs arranged in different directions in the image to be processed, based on the trained model; and extracting occlusion edge features with different orientations in the image to be processed based on the annotation results.

8. The calibration method according to claim 7, wherein the different directions comprise at least two of a horizontal direction, a vertical direction, a diagonal direction, and an anti-diagonal direction of the image to be processed.

9. The calibration method according to claim 3, wherein:

the image to be processed is an RGB image; and/or the image to be processed is from images captured by an image sensor in traffic road scenes.

10. The calibration method according to claim 1, wherein the extracted first occlusion edge feature includes first occlusion edges with various orientations located at multiple positions, and the extracted second occlusion edge feature includes second occlusion edges with various orientations located at multiple positions, the method further comprising:

matching first occlusion edges and second occlusion edges that are positionally adjacent and have a same orientation to obtain multiple successfully matched pairs of points composed of pixel points and point cloud points.

11. The calibration method according to claim 1, wherein the orientation of the first occlusion edge is determined based on occlusion directions of adjacent pixel pairs near the first occlusion edge, and the orientation of the second occlusion edge is determined based on occlusion directions of adjacent point cloud points near the second occlusion edge.

12. The calibration method according to claim 1, wherein the orientations of the first occlusion edge and the second occlusion edge both include at least one of: a left occlusion edge, a right occlusion edge, an upper occlusion edge, and a lower occlusion edge.

13. The calibration method according to claim 1, further comprising: annotating occlusion relationships of adjacent point cloud points based on a difference in depth values of adjacent point cloud points in the 3D point cloud data; and extracting a second occlusion edge feature from the 3D point cloud data according to an occlusion relationship of the annotated adjacent point cloud points.

14. The calibration method according to claim 1, characterized in that the calibration method comprises: iteratively performing steps for calibrating the first sensor and the second sensor.

15. The calibration method according to claim 1, wherein:

the first sensor comprises an onboard camera or a camera, and the second sensor comprises an onboard lidar; and/or relative positions of the first sensor and the second sensor are fixed.

16. A computer program product, characterized in that the computer program product comprises a computer program stored on a non-transitory computer readable medium, which, when executed by a processor, implements a calibration method according to claim 1.

17. A computer device comprising a processor, memory, and a computer program stored in the memory, characterized in that when the computer program is executed by the processor, it implements a calibration method according to claim 1.

\* \* \* \* \*